Sept. 30, 1924.

S. TOUSEY

X-RAY FILM CARRIER

Filed Feb. 10, 1919    2 Sheets-Sheet 1

Inventor:
Sinclair Tousey,
by Spear, Middleton, Donaldson & Spear
Atty's.

Sept. 30, 1924.

S. TOUSEY 1,510,424

X-RAY FILM CARRIER

Filed Feb. 10, 1919

Inventor:
Sinclair Tousey,
by Spear, Middleton, Donaldson & Spear
Attys.

Patented Sept. 30, 1924.

1,510,424

UNITED STATES PATENT OFFICE.

SINCLAIR TOUSEY, OF NEW YORK, N. Y.

X-RAY-FILM CARRIER.

Application filed February 10, 1919. Serial No. 275,988.

*To all whom it may concern:*

Be it known that I, SINCLAIR TOUSEY, a citizen of the United States, resident of New York, N. Y., have invented certain new and useful Improvements in X-Ray-Film Carriers, of which the following is a specification.

In the work entitled "Medical Electricity Röntgen Rays and Radium" second edition published by W. B. Saunders Company, Philadelphia and London, 1915, pages 862 and 863, there is described a vertical film-carrier for use in the mouth of the patient and consisting generally of a thin aluminum case to receive the film, having a closing member in the form of a cap which fits over the end of the case. My present invention is an improvement upon this film carrier.

The invention is shown in the accompanying drawings, in which.

Figure 3:
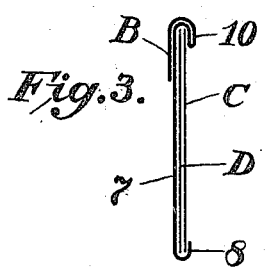
Figure 3 is a sectional view on line 3—3 of Fig. 1.

Figure 3$^a$ is a view of the blank from which the casing of the above figures is made.

Figure 4:
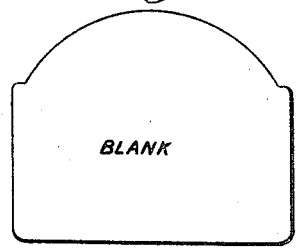
Figure 4:
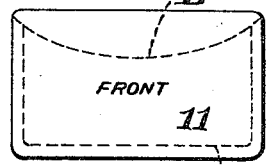

Figure 4 is a front view of another form of film carrier this presenting a front wall of even thickness throughout to make the picture field substantially of the same area as this front wall which is uniformly transparent to the X-rays.

Figure 5:
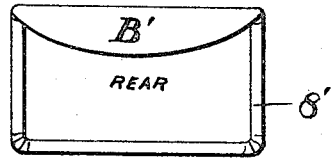

Figure 5 is a rear view of the casing of Figure 4.

Figure 6:
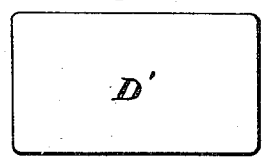
Figure 6:
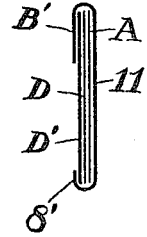

Figure 6 is a sectional view of the casing of Figures 4, 5 and 6.

Figure 6$^a$ is a plan view of the blank from which the front of the casing of Figures 4, 5 and 6 is formed.

Figure 6$^b$ is a plan view of the blank from which the back of the casing of Figures 4, 5 and 6 is formed.

Figure 7:
Figure 7:
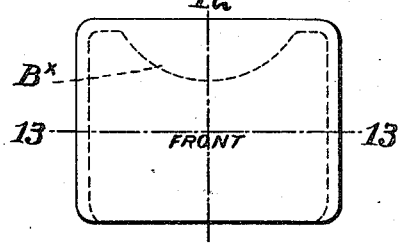

Figure 7 is a front view of a third form of casing.

Figure 8:
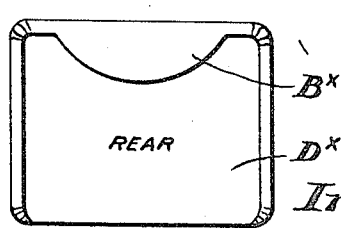

Figure 8 is a rear view of the casing of Figure 7.

Figure 9:
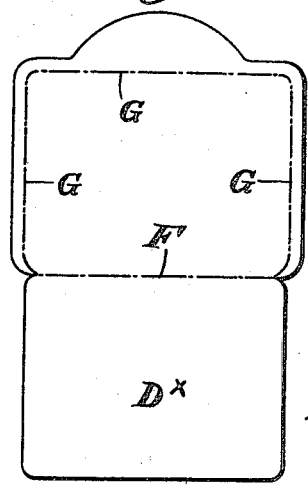

Figure 9 is a blank from which the casing of Figure 7 is made.

Figure 10:
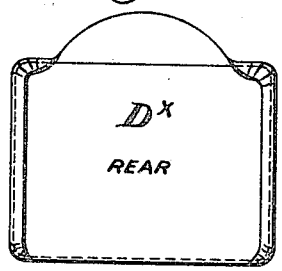

Figure 10 is the back of the casing of Figure 7, after the first fold has been made, but before the flap and flange have been folded over the edge of the back of the casing.

Figure 11:
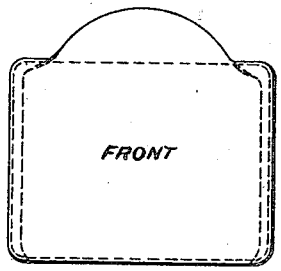

Figure 11 is the front of the casing of Figure 7 after the first fold has been made but before the flap and flange have been folded over the edge of the back of the casing, as indicated by the dotted line.

Figures 12, 13:
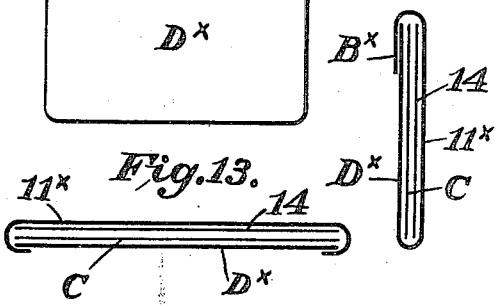

Figure 12 is a sectional view of the casing of Figure 7 on the line 12—12.

Figure 13 is a sectional view of the casing of Figure 7 on the line 13—13.

Figure 14:
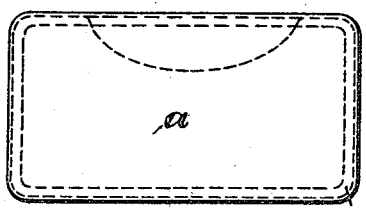

Fig. 14 is a front view of another form of film carrier.

Figure 15:
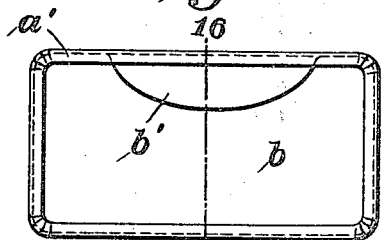

Fig. 15 is a rear view of Fig. 14.

Figure 16:
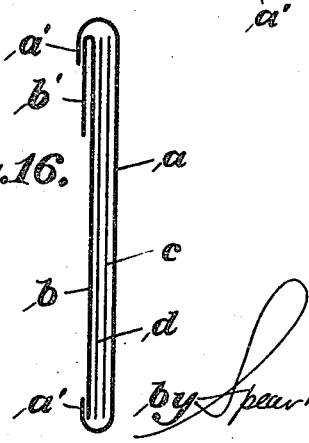

Fig. 16 is a sectional view on line 16—16 of Fig. 15.

Figure 17:
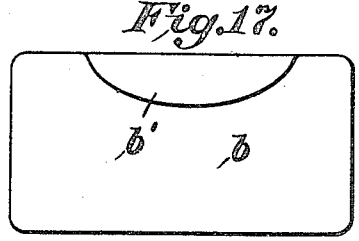

Fig. 17 is a rear view of the separate back piece forming a part of the carrier of Figs. 14, 15 and 16.

Figure 1:
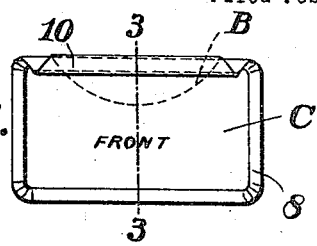
Figure 1 is a front view of a casing after removal of the black card or other substance transparent to the X-ray but protecting the enclosed films from light and moisture.
Figure 2:
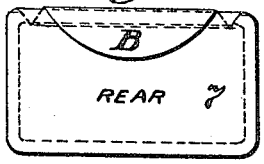
Figure 2 is a rear view of the casing shown in Figure 1.

In these drawings and referring to Figures 1 to 3$^a$, 7 indicates the main body of the casing which is formed of metal preferably soft annealed and has its edge turned at 8 over its front face around three sides of the plate or body while the fourth side is provided with a free flap B which, as shown at 10, is doubled upon itself to provide an inwardly projecting flange extending along one side of the holder or carrier, which performs a similar function to that of the inturned flange or edge 8 extending along the other three sides of the holder, viz, to hold the film within the casing. The film (or films) is indicated at D, and at C a sheet of black card board or other substance opaque to light but transparent to the ray. This is also held by the flange or inturned edge. The front surface is as non-absorbent as possible to protect the film from moisture when placed in the patient's mouth.

To gain access to the film after exposure, for its removal from the holder, the free flap B is pulled upon; and this pulls down the flange or edge 10 and leaves an opening at this point through which the film can be taken from the holder quickly and without danger of damage thereto and with less handling than would be the case if the narrow flange like 8 extended on all four sides and had to be pried up to get the film out of the case.

The less handling or manipulation the better as possibility of contact of the fingers with the face of the film is avoided and the operator is less liable to become infected from the saliva of the patient.

In this form of film carrier the side at which is located the black card board or other substance used for the same purpose is exposed to the X-ray instrument, this side being marked "front." The metal of the case while soft cannot be entirely transparent to the X-rays and consequently the field of exposure of the film is reduced by the overhanging flanges 8 and 10 and this is objectionable, because of preventing all of the area of the film being used.

In the form shown in Figures 4, 5, 6 and 6ª the front of the casing is made of aluminum, preferably soft which is uniformly transparent to the X-rays and here the front of the casing is the wall marked 11, this presenting a uniform thickness and transparency throughout the entire surface of the film, so that the picture will be as large as the film. The holding edge 8' lies on the back of the casing and the free flap B' also lies at the back and when pulled will open one edge or side of the casing through which opening the film can be removed. The film D is backed by a back plate D' of soft aluminum or of some other soft metal not necessarily transparent to the X-ray, and A indicates the black paper. The latter protects the sensitized surface of the film from contact with the metal.

Figures 7 to 13 show a third form of film carrier presenting a front wall of uniform thickness and uniform transparency to the X ray, making the picture field substantially of the same area as the front wall. This form has the further feature of being made from a single sheet of soft aluminum.

Referring to Figure 9 the dotted line F indicates the line at which the first fold is to be made; the part D$^x$ below forming the back of the casing. The dotted line GGG indicates the line along which the flap and the flange are subsequently to be folded over the edge of the back of the casing. In both Figs. 12 and 13, 11$^x$ is a portion of the enveloping case forming the front; 14 is a substance protecting the sensitized surface of film from contact with metal. C is film or films with or without X-ray opaque backing and D$^x$ is portion of enveloping case forming the back. B$^x$ is the flap.

In the form shown in Figures 14 to 17 a single sheet of preferably soft annealed aluminum forms both the front and back of the casing. The front wall is uniformly transparent to the X-rays. The holding edge and the flap for opening lie at the back of the casing. The sensitized surface of the contained film is protected from contact with the metal by a piece of black paper or other suitable substance. There may be enclosed back of the film a piece of sheet metal opaque to the X-rays if any secondary rays from behind entering through the back of the casing are thought to impair the quality of the resulting picture.

In Figs. 14 to 17 I show a carrier in which the front member $a$ has its edge turned over upon itself at the rear as indicated at $a'$, this turned edge extending completely around the margin of this member. The front wall $a$ is plain throughout and transparent to the X-rays so that the field of exposure is as large as the area of this front wall. Cooperating with this front member I employ back member $b$ consisting of a plain sheet of material having a flap or finger piece $b'$ turned over upon itself lying upon the rear face of this back member. As shown in Fig. 16 this back member is held by the overturned edge $a'$ of the front member which also grasps the back member along that portion where its flap or finger piece $b'$ is located but with a considerable portion of this flap or finger piece extending from under the said overturned edge $a'$ so that it is readily accessible to the user. In Fig. 16 $c$ indicates the black paper and $d$ the film or films with or without X-ray proof backing. In opening this carrier the operator or the user pulls the finger piece or flap $b'$ and this will turn the edge $a'$ which normally overlies the flap and thus access to the film may be had.

It will be seen from the above that in all three forms there is a flap which is drawn upon to open the casing. In all three forms the film is held in place by the turned in flange of the casing but in the two forms last described this flange is on the rear face of the casing, as is also the flap; and the front face is left of uniform thickness throughout to get a picture of the maximum area.

The object of employing soft annealed metal is to secure the flexibility desirable for use in various parts of the patient's mouth.

The separate back member may be of metal, or of any substance which will entirely protect the film from light and sufficiently protect it from moisture. This back member may be opaque to the X-ray or an X-ray proof-backing may be enclosed with the film. Either of these may be used in case there is danger from a secondary ray entering from the rear of the packet.

Certain features disclosed herein have been made the subject of a divisional application filed May 20, 1924, and certain features have been included in application filed Nov. 29, 1921.

What I claim is:

1. An X-ray film carrier of impressionable material having comparatively narrow edge portions turned upon itself to hold the film leaving one face bounded by said turned edge, a suitable substance overlying the film and protecting it on the latter face of the carrier, said carrier having a finger piece at and projecting relative to its narrow edge which when pulled upon will open the carrier.

2. An X-ray film carrier of impressionable material having comparatively narrow edge portions turned upon itself to hold the film leaving one face bounded by said turned edge, a suitable substance overlying the film and protecting it on the latter face of the carrier, said carrier having a finger piece at and projecting relative to its narrow edge which when pulled upon will open the carrier, both the turned edge and the finger piece lying upon the face of the carrier which is bounded by the turned edges, substantially as described.

3. An X-ray film carrier composed of a part having narrow edge portions turned upon itself to hold the film and another part consisting of a separate sheet of suitable substance overlying the film on that side of the first part upon which its turned edge portions are located, one of said parts having a finger piece projecting relative to said narrow edge for opening the carrier, substantially as described.

4. An X-ray film carrier consisting of a sheet of material having marginal narrow edge portions turned over upon itself on one face and an extension of one of said edge portions forming a finger piece projecting from said turned portion for opening the carrier, substantially as described.

5. An X-ray film carrier composed of a sheet of material having a narrow edge portion turned over upon the main body of the sheet, and a separate sheet located at said turned over edge and closing the space which said edge bounds, said edge having an integral projecting portion providing a finger piece by which the packet may be opened.

6. An X-ray film carrier consisting of a sheet of material having comparatively narrow edge portions turned over upon itself to hold the film, and having a finger piece at one edge wider than the said narrow edge portions, said film carrier also having a sheet portion overlying the film on the same side thereof where the narrow edge portions are located.

In testimony whereof, I affix my signature.

SINCLAIR TOUSEY.